United States Patent
Tsirkin (10) Patent No.: US 11,886,351 B2
(45) Date of Patent: *Jan. 30, 2024

(54) MEMORY EFFICIENT VIRTUAL ADDRESS MANAGEMENT FOR SYSTEM CALLS

(71) Applicant: Red Hat, Inc., Raleigh, NC (US)

(72) Inventor: Michael Tsirkin, Haifa (IL)

(73) Assignee: Red Hat, Inc., Raleigh, NC (US)

( * ) Notice: Subject to any disclaimer, the term of this patent is extended or adjusted under 35 U.S.C. 154(b) by 114 days.

This patent is subject to a terminal disclaimer.

(21) Appl. No.: 17/571,059

(22) Filed: Jan. 7, 2022

(65) Prior Publication Data

US 2022/0138112 A1 May 5, 2022

Related U.S. Application Data

(63) Continuation-in-part of application No. 16/829,398, filed on Mar. 25, 2020, now Pat. No. 11,221,869.

(51) Int. Cl.
*G06F 12/1009* (2016.01)

(52) U.S. Cl.
CPC .......... *G06F 12/1009* (2013.01); *G06F 2212/657* (2013.01)

(58) Field of Classification Search
CPC ........... G06F 9/45558; G06F 12/023; G06F 9/4555; G06F 12/1009; G06F 2212/657; G06F 2212/152; G06F 2212/1044; G06F 2009/45583; G06F 2212/151
See application file for complete search history.

(56) References Cited

U.S. PATENT DOCUMENTS

| 9,619,401 | B2 | 4/2017 | Gandhi et al. |
| 9,632,725 | B2 | 4/2017 | Munetoh |
| 9,672,354 | B2 | 6/2017 | Lutas et al. |
| 10,296,465 | B2 | 5/2019 | John et al. |

(Continued)

OTHER PUBLICATIONS

Laier "Towards Power-Aware Memory for Virtual Machines", Nov. 30, 2009, 65 pages, https://os.itec.kit.edu/downloads/da_2009_laier-max_pamm4vm.pdf.

(Continued)

*Primary Examiner* — Sean D Rossiter
(74) *Attorney, Agent, or Firm* — Lowenstein Sandler LLP (57) ABSTRACT

Systems and methods for managing host virtual addresses in a system call are disclosed. In one implementation, a processing device may receive, by a supervisor managing a first application), a system call initiated by the first application, wherein a first parameter of the system call specifies a memory buffer virtual address of the first application and a second parameter of the system call specifies the memory buffer virtual address of the second application. The processing device may also translate the memory buffer virtual address of the first application to a first physical address and may translate the memory buffer virtual address of the second application to a second physical address. The processing device may further compare the first physical address to the second physical address and responsive to determining that the first physical address matches the second physical address, the processing device may execute the system call using the memory buffer virtual address of the second application.

20 Claims, 8 Drawing Sheets

(56) References Cited

U.S. PATENT DOCUMENTS

| | | | |
|---|---|---|---|
| 10,977,188 B1 | 4/2021 | Lercari et al. | |
| 2016/0062802 A1* | 3/2016 | Guan | G06F 9/4881 |
| | | | 711/148 |
| 2016/0246730 A1* | 8/2016 | Gandhi | G06F 12/109 |
| 2016/0246732 A1* | 8/2016 | Shanbhogue | G06F 12/1036 |
| 2018/0373647 A1 | 12/2018 | Dewan et al. | |
| 2019/0034633 A1* | 1/2019 | Seetharamaiah | G06F 9/45558 |
| 2019/0205149 A1* | 7/2019 | Zhang | G06F 9/45558 |
| 2020/0073689 A1* | 3/2020 | Tsirkin | G06F 3/0673 |
| 2020/0073691 A1 | 3/2020 | Tsirkin et al. | |
| 2020/0242263 A1* | 7/2020 | Hajnoczi | G06F 21/6218 |
| 2020/0265137 A1* | 8/2020 | Yoon | G06F 12/1433 |

OTHER PUBLICATIONS

Xia et al., "Architecture Support for Guest-Transparent VM Protection from Untrusted Hypervisor and Physical Attacks", Institute of Parallel and Distributed Systems, Shanghai Jiao Tong University, 2013, 12 pages, http://class.ece.iastate.edu/tyagi/cpre581/papers/HPCA13VMProtection.pdf.

Gandhi et al., "Efficient Memory Virtualization", Department of Computer Sciences University of Wisconsin-Madison Madison, WI, USA; AMD Research Advanced Micro Devices, Inc. Austin, TX, USA, 2014, 12 pages, http://pages.cs.wisc.edu/~swift/papers/micro14-virtualization.pdf.

\* cited by examiner

MEMORY EFFICIENT VIRTUAL ADDRESS MANAGEMENT FOR SYSTEM CALLS

RELATED APPLICATIONS

The present application is a continuation in part of application Ser. No. 16/829,398, filed Mar. 25, 2020, entitled "Memory Efficient Host Virtual Address Management for Hypercalls" which is incorporated by reference herein in its entirety.

TECHNICAL FIELD

The disclosure is generally related to virtualization systems, and is more specifically related to memory efficient virtual address management for system calls.

BACKGROUND

Virtualization is a computing technique that improves system utilization, decoupling applications from the underlying hardware, and enhancing workload mobility and protection. Virtualization may be realized through the implementation of virtual machines (VMs) and containerized application. A VM is a portion of software that, when executed on appropriate hardware, creates an environment allowing the virtualization of a physical computer system (e.g., a server, a mainframe computer, etc.). The term "container," as known in the art, refers to (1) an executable software package that bundles the executable code for one or more applications together with the related configuration files, libraries, and dependencies, and (2) isolated execution environment for running the executable code retrieved from the executable software package. The isolated execution environment may be provided by an isolated instance of the user space (i.e., unprivileged execution environment), while possibly sharing the kernel space (i.e., privileged execution environment in which at least part of the operating system kernel runs) with other execution environments (e.g., other containers).

The physical computer system is typically referred to as a "host machine," and the operating system of the host machine is typically referred to as the "host operating system." A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, and so on. Similarly, containers with their respective applications (i.e., containerized applications) can be managed by a supervisor. A supervisor can refer to a software module that manages multiple applications running within a single execution environment (e.g., container).

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Implementations of the disclosure are directed to memory efficient virtual address management for system calls.

Certain processor architectures support virtualization by providing special instructions for facilitating virtual machine execution. In certain implementations, a processor may support executing a hypervisor that acts as a host and has full control of the processor and other platform hardware. A hypervisor presents a virtual machine with an abstraction of one or more virtual processors. A hypervisor is able to retain selective control of processor resources, physical memory, interrupt management, and input/output (I/O). Each virtual machine (VM) is a guest software environment that supports a stack consisting of operating system (OS) and application software. Each VM operates independently of other virtual machines and uses the same interface to the processors, memory, storage, graphics, and I/O provided by a physical platform. The software executing in a virtual machine is executed at the reduced privilege level so that the hypervisor can retain control of platform resources. When a VM needs to perform a privileged operation (e.g., perform an I/O operation), the VM may do so by sending a hypercall to the hypervisor, requesting that the hypervisor perform the privileged operation on behalf of the VM. Thus a hypercall refers to a privileged processor operation that can be invoked by a virtual machine without performing a VM exit.

Certain processor architectures support virtualization by providing special instructions for facilitating containerized application execution. In certain implementations, a containerized application may be an application running in a container in a virtual system environment and a processor may support executing a supervisor that acts as a host and has full control of the processor and other platform hardware. A supervisor can be a software module that can monitor and control multiple processes and applications running in containers on a host system. A supervisor is a tool that is able to retain selective control of processor resources, physical memory, interrupt management, and input/output (I/O). Each container is an executable software package that bundles the executable code for one or more applications together with the related configuration files, libraries, and dependencies, and is an isolated execution environment for running the executable code retrieved from the executable software package. The isolated execution environment may be provided by an isolated instance of the user space (i.e., unprivileged execution environment), while sharing the kernel space (i.e., privileged execution environment in which at least part of the operating system kernel runs) with other execution environments (e.g., other containers). Each container can operate independently of other containers and uses the same interface to the processors, memory, storage, graphics, and I/O provided by a physical platform. The software executing in a container can be executed at the reduced privilege level so that the supervisor can retain control of platform resources. When a containerized application needs to perform a privileged operation (e.g., perform an I/O operation), the containerized application may do so by sending a system call to the supervisor, requesting that the supervisor perform the privileged operation on behalf of the containerized application.

Handling hypercalls from virtual machines by the hypervisor frequently require accessing one or more memory buffers that are passed as parameters of the hypercall from the VM to the hypervisor, for example to read data from the memory buffers and/or write data to the memory buffers. In order to access the memory buffers, the hypervisor needs to map the guest memory address of the memory buffer that is provided by the VM to the corresponding address in the host virtual address space. This guest address to host address translation represents a significant source of overhead for the hypervisor. For example, when a guest memory address space for a given VM is significantly large, the hypervisor pages tables that are used for mapping a guest address to a host virtual address can be significantly large, thus the performance penalty for parsing these page tables to find a particular address range can be significant.

Similarly, handling system calls from a containerized application by the supervisor can frequently require accessing one or more memory buffers that are passed as parameters of the system call from the containerized application to the supervisor, for example to read data from the memory buffers and/or write data to the memory buffers. To access the memory buffers, the supervisor may have to map the one application's virtual memory address of the memory buffer that is provided by the containerized application to the corresponding address in another application's (e.g., an operating system's) virtual address space. The other application may have privileged access to certain resources that the containerized application may request. This first application address to second application address translation can also be a significant source of overhead for the supervisor. For example, when an application's memory address space for a given containerized application is significantly large, the supervisor pages tables that are used for mapping an application's virtual address to another application's virtual address can be significantly large, thus the performance penalty for parsing these page tables to find a particular address range can be significant.

Conventionally, the hypervisor or supervisor may implement techniques such as hash tables to expedite scanning the page tables that map guest memory space to host virtual memory space or that respectively maps one application's virtual memory space to another application's memory space. These solutions, however, adds run-time overhead to keep the page tables in sync with internal page tables of the host. Additionally, they introduce additional memory overhead for creating and maintaining additional hash tables for accessing the hypervisor page tables that map guest memory space to host memory space or for accessing the supervisor page tables that map one application's virtual memory space the another application's memory space.

Aspects of the disclosure address the above and other deficiencies by providing memory efficient host virtual address management for hypercalls. A hypercall issued by a virtual machine (VM) would typically include an address to a memory buffer, which the VM has allocated for transferring one or more parameter values to the hypervisor and/or receiving one or more parameter values produced by the hypervisor executing the hypercall. In an illustrative example, the VM may issue a hypercall to the hypervisor to read data from a file in a file system of the host into a memory buffer. However, instead of specifying just the guest physical address (GPA) of the memory buffer, the VM may also specify the host virtual address (HVA) of the memory buffer, thus relieving the hypervisor from maintaining the above-noted guest physical to host virtual address translation tables. However, since in general the VM should not be trusted by the hypervisor (and thus may presumably supply a HVA that does not in fact correspond to the GPA of the memory buffer allocated by the VM for servicing the hypercall, the hypervisor should validate the HVA before using it for executing the hypercall. In an illustrative example, the validation may involve comparing two host physical addresses (HPAs) produced, respectively, by translating the GPA supplied by the hypercall to a corresponding HPA, and translating the HVA supplied by the hypercall to a corresponding HPA. Notably, both translations may be performed by the hypervisor using the respective GPA-HPA and HVA-HPA translation tables, which are already maintained by the hypervisor for other uses, and those two translations may be performed much more efficiently than a direct GVA-HVA translation that would need to be performed otherwise. Accordingly, should the two HPAs yielded by the respective GPA-HPA and HVA-HPA translations match, the HVA supplied by the VM may be considered as being true HVA corresponding to the VM-supplied GPA, and the hypervisor may proceed to execute the hypercall utilizing the validated HVA.

On the other hand, should the two HPAs yielded by the respective GPA-HPA and HVA-HPA translations fail to match, the hypervisor may notify the VM that the hypercall has not been executed by returning an error to the VM. In implementations, the error status may be communicated to the VM as an error code indicating that the hypercall execution has failed. In another example, the error code may additionally indicate to the VM that at least one of the HVA or the GPA that are provided as parameters in the hypercall is invalid.

In order to supply the HVA with the hypercall, the VM may, upon allocating the memory buffer or at a later time, request the HVA of the memory buffer from the hypervisor. Such a request may be performed via a paravirtualized interface. Paravirtualization refers to a virtualization technique which involves modifying the guest operating system in order to allow more efficient performance of certain functions in the virtualized environment, as compared to the same operating system running directly on the underlying hardware. Accordingly, a paravirtualized interface refers to an interface that is missing from the operating system running directly on the underlying hardware, and is added to the guest operating system in order to allow more efficient performance of certain functions in the virtualized environment. Aspects of the disclosure further address the above-mentioned and other deficiencies by providing memory efficient virtual address management for system calls. A system call issued by a containerized application could include an address of a memory buffer, which the containerized application has allocated for transferring one or more parameter values to the supervisor and/or receiving one or more parameter values produced by the supervisor executing the system call. In an illustrative example, the containerized application may issue a system call to the supervisor to read data from a file in a file system of another containerized application into a memory buffer. However, instead of specifying just the first application's virtual memory address of the memory buffer, the containerized application may also specify the second application's (e.g., operating system's) virtual memory address of the memory buffer, thus relieving the supervisor from maintaining the above-noted first application virtual address to second application virtual address translation tables. However, since in general a containerized application might not be trusted by a supervisor (and thus may presumably supply a virtual address that does not in fact correspond to the virtual memory address of the memory buffer allocated by the first containerized application for servicing the system call, the supervisor can validate the second containerized application's (e.g., operating system's) virtual address before using it for executing the system call. In an illustrative example, the validation may involve comparing two physical addresses produced, respectively, by translating the first application's virtual address supplied by the system call to a corresponding physical address, and translating the second application's (e.g., operating system's) virtual address supplied by the system call to a corresponding physical address. Notably, both translations may be performed by the supervisor using respective first-application-virtual-address-to-physical-address and second-application-virtual-address-to-physical-address translation tables, which can already be maintained by the supervisor for other uses. Those two translations may be performed much more efficiently than a direct first-application-virtual-address-to-second-application-virtual-address translation that would need to be performed otherwise. Accordingly, should the two physical addresses yielded by the respective first-application-virtual-address-to-physical-address and second-application-virtual-address-to-physical-address translations match, the second application's (e.g., operating system's) virtual address supplied by the first containerized application may be considered as being the true virtual address of the second application corresponding to the physical address supplied by the first containerized application, and the supervisor may proceed to execute the system call utilizing the validated virtual address of the second containerized application (e.g., operating system).

However, should the two physical addresses yielded by the respective first-application-virtual-address-to-physical-address and second-application-virtual-address-to-physical-address translations fail to match, the supervisor may notify the first containerized application that the system call has not been executed by returning an error to the first containerized application. In some implementations, the error status may be communicated to the first containerized application as an error code indicating that the system call execution has failed. In other implementations, the error code may additionally indicate to the first containerized application that at least one of the virtual address of the second containerized application (e.g., operating system) or the virtual address of the first containerized application that were provided as parameters in the system call is invalid.

In order to supply the virtual address of the second containerized application (e.g., operating system) with the system call, the first containerized application may, upon allocating the memory buffer or at a later time, request the virtual address of the memory buffer of the second application (e.g., operating system) from the supervisor. Such a request may be performed via a paravirtualized interface. Paravirtualization refers to a virtualization technique which involves modifying the first application's container in order to allow more efficient performance of certain functions in the virtualized environment, as compared to an operating system running directly on the underlying hardware. Accordingly, a paravirtualized interface refers to an interface that is missing from the operating system running directly on the underlying hardware, and is added to the container in order to allow more efficient performance of certain functions in the virtualized environment.

Thus, implementations of the disclosure utilize existing virtual machine page tables and hypervisor page tables that are maintained by the hypervisor to improve performance and memory utilization of the host system in a virtualized environment. By supplying both the GPA and the HVA of the memory buffer as hypercall parameters, the guest operating system relieves the hypervisor from maintaining a shadow translation table mapping the guest virtual address space of the VM to the host virtual address space. Since validation of the HVA provided by the VM can be performed using existing page tables that are maintained by the hypervisor for other uses, the methods of the present disclosure do not burden the hypervisor with maintaining any additional data structures. By eliminating the need maintain a shadow translation table mapping the guest virtual address space of the VM to the host virtual address space, the host memory consumption is significantly reduced, thus resulting in improved performance of executing hypercalls by the host.

Similarly, implementations of the disclosure utilize existing containerized application page tables and supervisor page tables that are maintained by the supervisor to improve performance and memory utilization of the host system in a virtualized environment. By supplying both the first containerized application's virtual address and the second application's (e.g., operating system's) virtual address of the memory buffer as system call parameters, the containerized application relieves the supervisor from maintaining a shadow translation table mapping the first application's virtual address space to the second application's (e.g., operating system's) virtual address space. Since validation of the second containerized application's (e.g., operating system's) virtual address provided by the first containerized application can be performed using existing page tables that are maintained by the supervisor for other uses, the methods of the present disclosure do not burden the supervisor with maintaining any additional data structures. By eliminating the need maintain a shadow translation table mapping the first containerized application's virtual address space to the second containerized application's (e.g., operating system's) virtual address space, the host memory consumption is significantly reduced, thus resulting in improved performance of executing system call by the supervisor of host.

Figure 1:
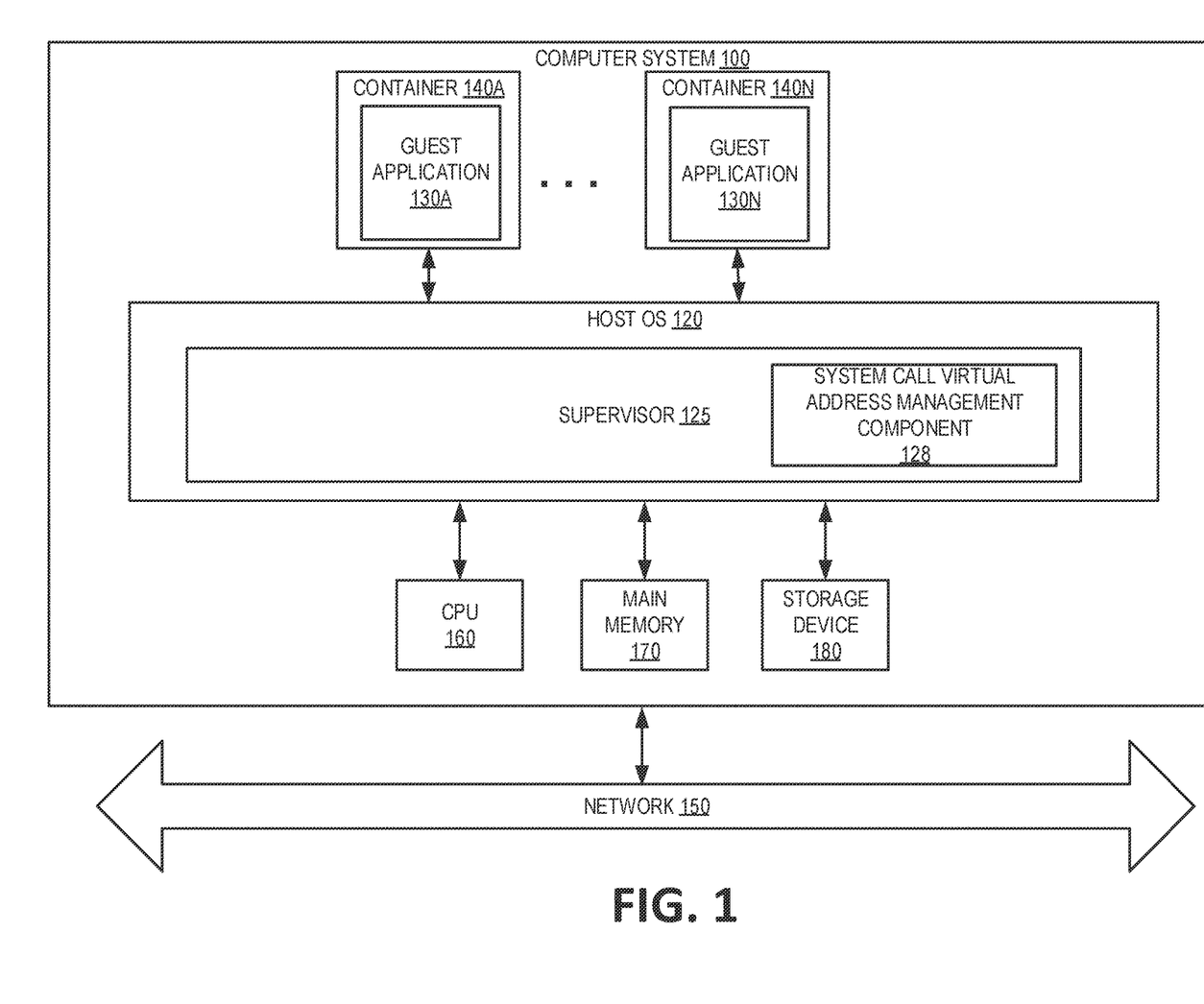
FIG. 1 depicts a high-level diagram of an example system architecture operating in accordance with one or more aspects of the disclosure.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted by FIG. 1. As shown in FIG. 1, the computer system 100 is connected to a network 150 and comprises central processing unit (CPU) 160, main memory 170, which can include volatile memory devices (e.g., random access memory (RAM)), non-volatile memory devices (e.g., flash memory), and/or other types of memory devices, and storage device 180 (e.g., a magnetic hard disk, a Universal Serial Bus (USB) solid state drive, a Redundant Array of Independent Disks (RAID) system, a network attached storage (NAS) array, etc.) that serves as a secondary memory, interconnected as shown. Although, for simplicity, a single CPU is depicted in FIG. 1, in some other embodiments computer system 100 can comprise a plurality of CPUs. Similarly, in some other embodiments computer system 100 can comprise a plurality of storage devices 180, rather than a single storage device 180. The computer system 100 can be a server, a mainframe, a workstation, a personal computer (PC), a mobile phone, a palm-sized computing device, etc. The network 150 can be a private network (e.g., a local area network (LAN), a wide area network (WAN), intranet, etc.) or a public network (e.g., the Internet).

Computer system 100 runs a host operating system (OS) 120, which can comprise software that manages the hardware resources of the computer system and that provides functions such as inter-process communication, scheduling, virtual memory management, and so forth. In some examples, host operating system 120 also comprises a supervisor 125, which provides a virtual operating platform for guest applications 130A-130N within respective containers 140A-140N and manages their execution. Each containerized application 130A-N within respective containers 140A-140N can be a software implementation of a containerized application capable of being executed on various physical machines and environments. In some implementations, the OS 120 can itself be a containerized application. It should be noted that in some other examples, supervisor 125 can be external to host OS 120, rather than embedded within host OS 120. As shown, supervisor 125 can include system call virtual address management component 128 that may facilitate memory efficient virtual address management for executing system calls by the supervisor.

When system call virtual address management component 128 receives a system call from containerized application 130A, the system call may include parameters referencing a memory buffer that may be accessed by system call virtual address management component 128 to perform the system call. Application 130A may send at least two parameters as part of the system call. One of the parameters may be a first containerized application's 130A virtual address of the memory buffer. The other parameter may be a second containerized application's (e.g., operating system's 120) virtual address of the memory buffer. In implementations, containerized application 130A may request the memory buffer virtual address of the second application (e.g., operating system) 120 from supervisor 125 using a paravirtualized interface before initiating the system call to supervisor 125. When the containerized application 130A receives the virtual address of the memory buffer of the second containerized application (e.g., operating system 120), containerized application 130A may initiate the system call with two references to the memory buffer, the memory buffer virtual address of the first application 130A and the memory buffer virtual address of the second application (e.g., operating system 120).

System call virtual address management component 128 may then use the memory buffer virtual address of the second application (e.g., operating system 120) that is identified in the system call to access the memory buffer referenced by the system call. In implementations, system call virtual address management component 128 may validate the memory buffer virtual address of the first application (e.g., operating system 120) received from containerized application 130A before using the memory buffer virtual address of the second application (e.g., operating system 120) when executing the system call, to ensure that containerized application 130A provided a valid memory buffer virtual address of the second containerized application (e.g., operating system 120). To perform this validation, system call virtual address management component 128 may use a supervisor page table that is maintained by supervisor 125 for translating the memory buffer virtual address of the second containerized application (e.g., operating system 120) to a physical address of the memory buffer. System call virtual address management component 128 may also use a shadow page table (e.g., a virtual machine page table) that is maintained by supervisor 125 for translating the memory buffer virtual address of the first containerized application 130A to another physical address. After translating the memory buffer virtual address of the second containerized application (e.g., operating system 120) into a first physical address and the memory buffer virtual address of the first containerized application 130A into a second physical address, system call virtual address management component 128 may compare the first physical address and the second physical address to find out whether the two physical addresses match each other (i.e., the two physical addresses match if the two physical address are identical to one another). If system call virtual address management component 128 determines that the two physical addresses match, system call virtual address management component 128 may determine that the memory buffer virtual address of the second containerized application (e.g., operating system 120) that is provided by containerized application 130A is valid. System call virtual address management component 128 may then proceed to execute the system call using the memory buffer virtual address of the second containerized application (e.g., operating system 120) to access the memory buffer, without the need to map the first application's virtual address space to the second application's virtual address space.

Alternatively, if system call virtual address management component 128 determines that the first physical address does not match the second physical address (e.g., by determining that the first physical address is not identical to the second physical address), system call virtual address management component 128 may decide that the memory buffer virtual address of the second containerized application (e.g., operating system 120) that is provided by containerized application 130A is invalid, and may determine that the system call may not be executed. In this case, system call virtual address management component 128 may notify containerized application 130A that the system call has not been executed by returning an error to containerized application 130A, indicating that the memory buffer virtual address of the second containerized application (e.g., operating system 120) is invalid. In certain implementations, system call virtual address management component 128 may send the memory buffer virtual address of the second containerized application (e.g., operating system 120) corresponding to the memory buffer virtual address of the first containerized application 130A to containerized application 130A. Application 130A may subsequently use the valid memory buffer virtual address of the second containerized application (e.g., operating system 120) when issuing a new system call to the supervisor, without having to make a separate request for the memory buffer virtual address of the second containerized application (e.g., operating system 120) from the supervisor.

Figure 2:
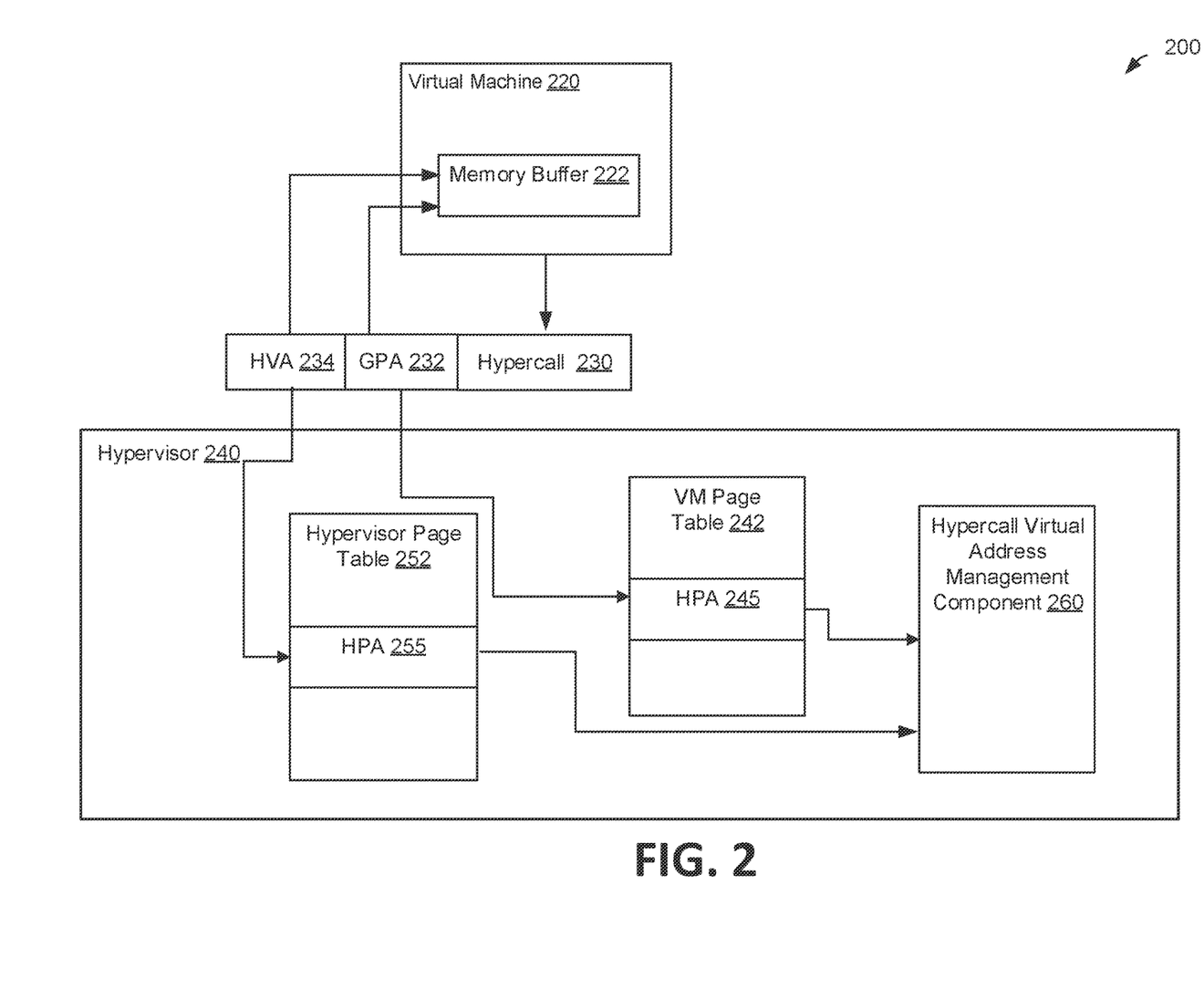
FIG. 2 depicts a block diagram of an apparatus illustrating the translation of a guest physical address (GPA) and a host virtual address (HVA) of a hypercall from a virtual machine to the hypervisor, in accordance with one or more aspects of the present disclosure.

FIG. 2 depicts a block diagram of an apparatus 200 illustrating the translation of a guest physical address (GPA) and a host virtual address (HVA) of a hypercall from a virtual machine to the hypervisor, in accordance with one or more aspects of the present disclosure. The apparatus 200 may be compared to computer system 100 of FIG. 1. For example, the apparatus 200 includes hypercall virtual address management component 260 (which may be compared to hypercall virtual address management component 128 of FIG. 1), virtual machine (VM) 220 (which may be compared to the VMs 130A-130N of FIG. 1) and hypervisor 240 (which may be compared to hypervisor 125 of FIG. 1).

In some implementations, VM 220 transmits hypercall 230 to hypervisor 240, for example, to request the execution of a privileged operation from hypervisor 240. Privileged operation may be an operation that the VM does not have access to execute, thus the VM makes a request to the hypervisor to execute. An example of a privileged operation may be reading data from a file that is stored in a storage device accessible by the host. In this case, VM 220 may send a reference to memory buffer 222 that may be accessed by hypervisor 240 to perform hypercall 230. In certain implementations, in order to avoid mapping the guest address space to the host address space, VM 220 may send two references to memory buffer 222 as parameters to hypercall 230; guest physical address (GPA) 232 and host virtual address (HVA) 234 of memory buffer 222. In implementations, VM 220 may request HVA 234 of memory buffer 222 from hypervisor 240 using a paravirtualized interface before initiating hypercall 230 to hypervisor 240. VM 220 may provide HVA 234 as a parameter to hypercall 230 and may send hypercall 230 to hypervisor 240.

When hypervisor 240 receives hypercall 230 from VM 220, hypervisor 240 may use HVA 234 hypercall 230 to access memory buffer 222 after validating that HVA 234 is a correct address for memory buffer 222. To perform this validation, hypervisor 240 may use VM page table 242 to translate GPA 232 from the hypercall to HPA 245. VM page table 242 may be a page table that is maintained by the host to translate guest VM physical memory addresses to host physical memory addresses. In implementations, VM page table 242 may be cached to enable faster access and consequently faster memory address translation. Hypervisor may further use hypervisor page table 252 to translate HVA 234 from the hypercall to HPA 255. Similar to VM page table 242, hypervisor page table 252 may be a page table that is maintained by the host to translate host virtual memory addresses to host physical memory addresses. In implementations, hypervisor page table 252 may be cached to enable faster access and consequently faster memory address translation.

After translating GPA 232 to HPA 245 and HVA 234 to HPA 255, hypervisor 240 may send HPA 245 and HPA 255 to hypercall virtual address management component 260 to validate the HPAs and execute hypercall 230. In implementations, hypercall virtual address management component 260 may compare HPA 245 and HPA 255 to find out if the two HPAs match each other (e.g., HPA 245 matches HPS 255 if HPA 245 is identical to HPA 255). If hypercall virtual address management component 260 determines that the two HPAs match, hypercall virtual address management component 260 may determine that HVA 234 that is provided by VM 220 in hypercall 230 is valid, and hypercall virtual address management component 260 may thus proceed to execute hypercall 230 using HVA 234 to access memory buffer 222.

On the other hand, if hypercall virtual address management component 260 determines that HPA 245 does not match HPA 255, the hypercall virtual address management component 260 may decide that HVA 234 that is provided by VM 220 is invalid, and may thus determine that hypercall 230 may not be executed. In certain implementations, hypercall virtual address management component 260 may then notify VM 220 that hypercall 230 has not been executed by returning an error to VM 220. In implementations, the error status may be communicated to VM 220 as an error code indicating that hypercall 230 execution has failed. In another example, the error code may additionally indicate to VM 220 that at least one of HVA 234 or GPA 232 that are provided as parameters in hypercall 230 is invalid. In other implementations, in addition to sending an error code to VM 220, hypercall virtual address management component 260 may also send to VM 220 the valid HVA that corresponds to GPA 232 of memory buffer 222. In this case, VM 220 may issue another hypercall to hypervisor 240 using the valid HVA without having to issue another request for an HVA from hypervisor 240.

Figure 2B:
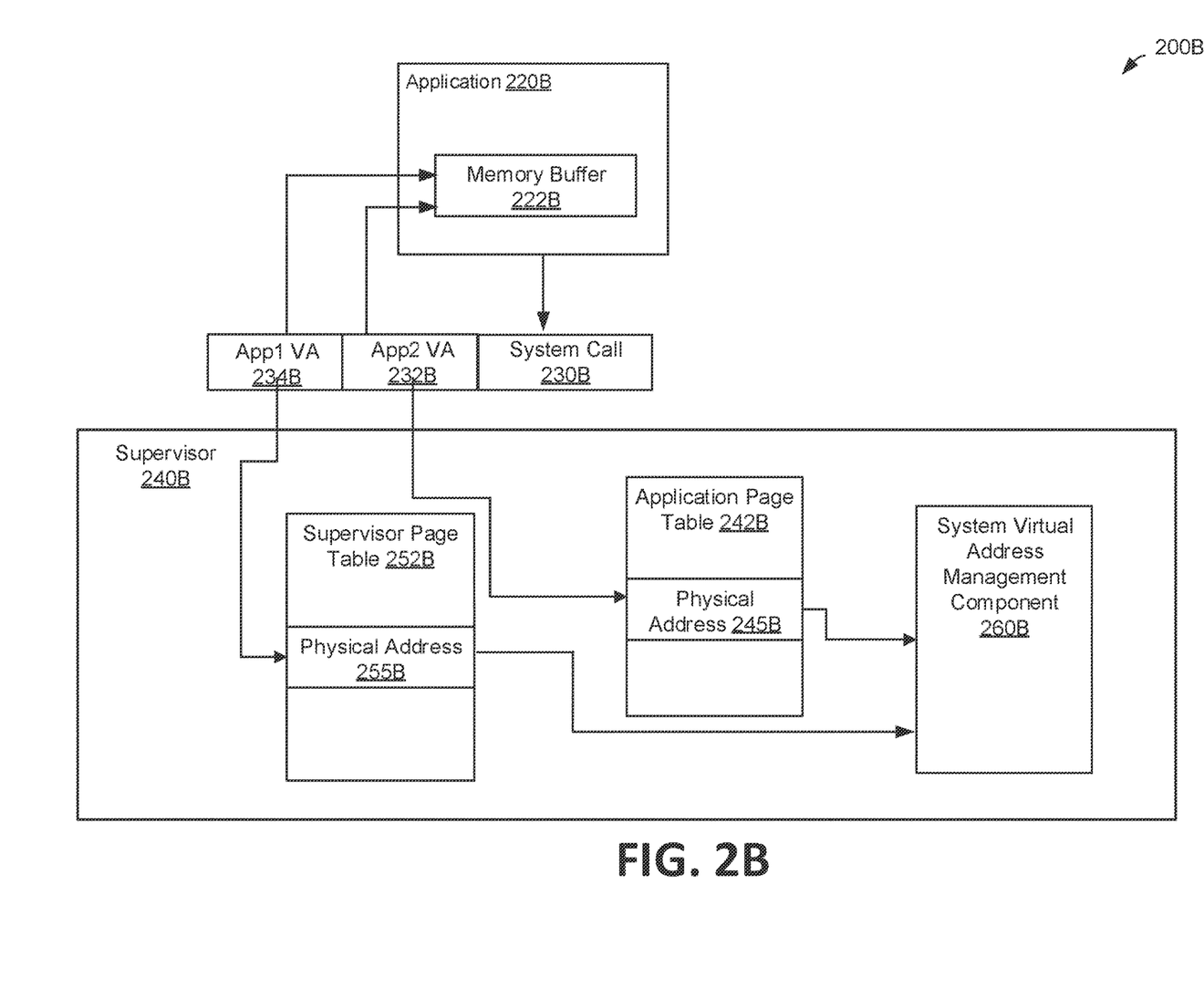
FIG. 2B depicts a block diagram of an apparatus illustrating the translation of a virtual addresses of a system call from a containerized application to the supervisor, in accordance with one or more aspects of the present disclosure.

FIG. 2B depicts a block diagram of an apparatus 200B illustrating the translation of a first application's memory buffer virtual address and a second application's memory buffer virtual address of a system call from the first application to the supervisor, in accordance with one or more aspects of the present disclosure. The apparatus 200B may be analogous to computer system 100 of FIG. 1. For example, the apparatus 200B includes system call virtual address management component 260B (which may be analogous to system call virtual address management component 128 of FIG. 1), application 220B (which may be analogous to the applications 130A-130N in containers 140A-140N of FIG. 1) and supervisor 240B (which may be compared to supervisor 125 of FIG. 1).

In some implementations, application 220B transmits system call 230B to supervisor 240B, for example, to request the execution of a privileged operation from supervisor 240B. Privileged operation may be an operation that the application does not have access to execute, thus the application makes a request to the supervisor to execute. An example of a privileged operation may be reading data from a file that is stored in a memory location accessible by another application. In this case, application 220B may send a reference to memory buffer 222B that may be accessed by supervisor 240B to perform system call 230B. In certain implementations, in order to avoid mapping the virtual address space of the first application to the virtual address space of the second application (e.g., operating system), application 220B may send two references to memory buffer 222B as parameters to system call 230B: the first application's virtual address 232B of the memory buffer 222B and the second application's (e.g., operating system's) virtual address 234B of the memory buffer 222B. In some implementations, application 220B may request the virtual address 234B of memory buffer 222B from supervisor 240B using a paravirtualized interface before initiating a system call 230B to supervisor 240B. Application 220B may provide the virtual address 234B as a parameter to system call 230B and may send system call 230B to supervisor 240B.

When supervisor 240B receives system call 230B from application 220B, supervisor 240B may use virtual address 234B system call 230B to access memory buffer 222B after validating that the virtual address 234B is a correct address for memory buffer 222B. To perform this validation, supervisor 240B may use application page table 242B to translate the virtual address 232B from the system call to physical address 245B. Application page table 242B may be a page table that is maintained by the supervisor 240B to translate one application's virtual memory addresses to physical memory addresses. In some implementations, application page table 242B may be cached to enable faster access and consequently faster memory address translation. Supervisor may further use supervisor page table 252B to translate the virtual address 234B from the system call to physical address 255B. Similar to application page table 242B, supervisor page table 252B may be a page table that is maintained by the supervisor 240B to translate another application's virtual memory addresses to physical memory addresses. In some implementations, supervisor page table 252B may be cached to enable faster access and consequently faster memory address translation.

After translating the virtual address 232B to physical address 245B and the virtual address 234B to physical address 255B, supervisor 240B may send physical address 245B and physical address 255B to system call virtual address management component 260B to validate the physical addresses and execute system call 230B. In some implementations, system call virtual address management component 260B may compare physical address 245B and physical address 255B to find out if the two physical addresses match each other (i.e., physical address 245B matches HPS 255B if physical address 245B is identical to physical address 255B). If system call virtual address management component 260B determines that the two physical addresses match, system call virtual address management component 260B may determine that the virtual address 234B that is provided by application 220B in system call 230B is valid, and system call virtual address management component 260B may thus proceed to execute system call 230B using the virtual address 234B to access memory buffer 222B.

On the other hand, if system call virtual address management component 260B determines that physical address 245B does not match physical address 255B, the system call virtual address management component 260B may decide that the virtual address 234B that is provided by application 220B is invalid, and may thus determine that system call 230B may not be executed. In certain implementations, system call virtual address management component 260B may then notify application 220B that system call 230B has not been executed by returning an error to application 220B. In some implementations, the error status may be communicated to application 220B as an error code indicating that system call 230B execution has failed. In another example, the error code may additionally indicate to application 220B that at least one of the virtual address 234B or the virtual address 232B that are provided as parameters in system call 230B is invalid. In other implementations, in addition to sending an error code to application 220B, system call virtual address management component 260B may also send to application 220B the valid virtual address 234B (of the second application (e.g., operating system)) of the memory buffer 222B that corresponds to virtual address 232B (of the first application) of memory buffer 222B. In this case, application 220B may issue another system call to supervisor 240B using the valid virtual address without having to issue another request for the second application's (e.g., operating system's) virtual address of the memory buffer from supervisor 240B.

Figure 3:
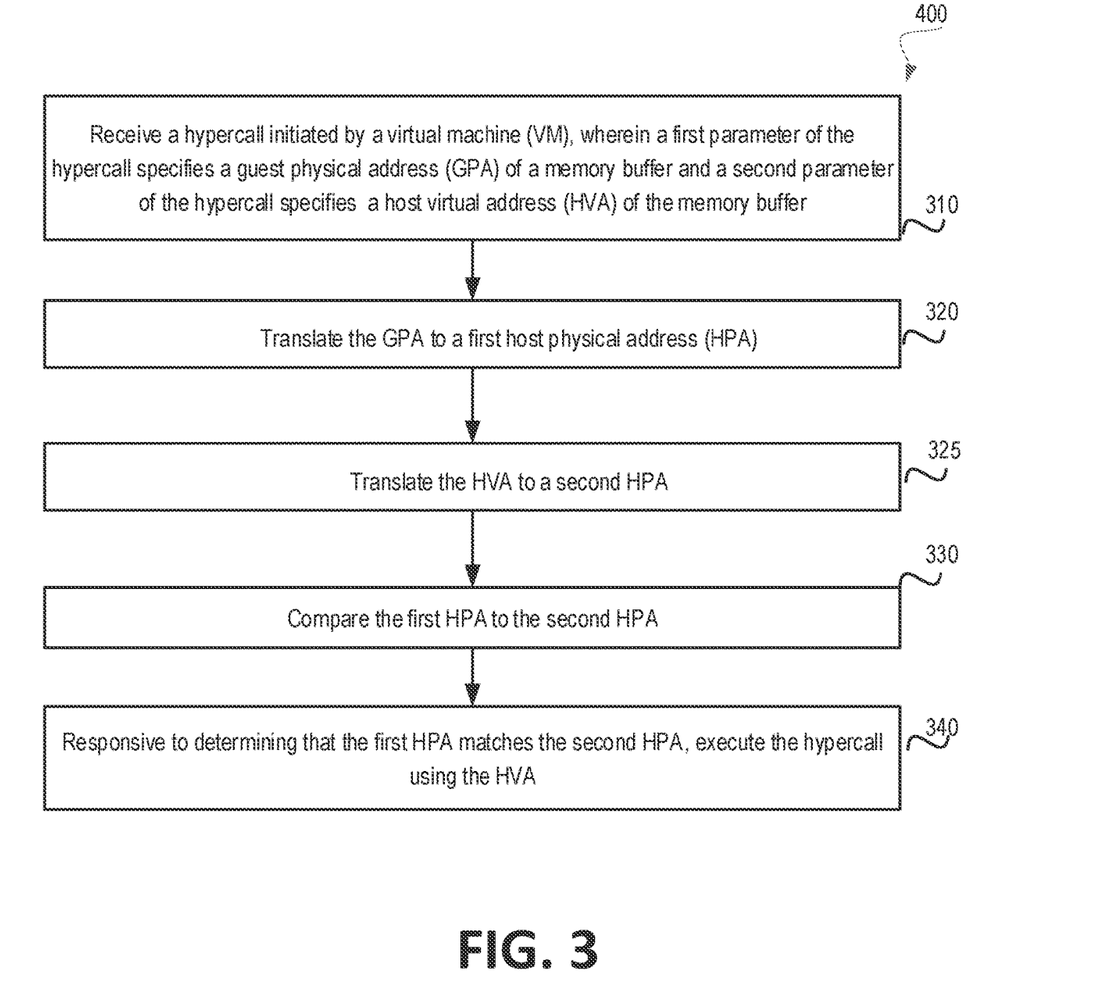
FIG. 3 is a flow diagram of an example method of memory efficient host virtual address management for hypercalls, in accordance with one or more aspects of the present disclosure.

FIG. 3 is a flow diagram of an example method of memory efficient host virtual address management for hypercalls, in accordance with one or more aspects of the present disclosure. Method 300 may be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations may be performed by one or more processors of a computer system (e.g., the computer system 100 of FIG. 1 or apparatus 200 of FIG. 2) implementing the method. In an illustrative example, method 300 may be performed by a single processing thread. Alternatively, method 300 may be performed by two or more processing threads, each thread implementing one or more individual functions, routines, subroutines, or operations of the method. In an illustrative example, the processing threads implementing method 300 may be synchronized (e.g., using semaphores, critical sections, or other thread synchronization mechanisms). Alternatively, the processing threads implementing method 300 may be executed asynchronously with respect to each other. Therefore, while FIG. 3 and the associated description lists the operations of method 300 in certain order, various implementations of the method may perform at least some of the described operations in parallel or in arbitrary selected orders.

Method 300 may begin at block 310. At block 310, the processing logic may receive, by a hypervisor managing a virtual machine (VM), a hypercall initiated by the VM. The hypercall may have at least two parameters; a first parameter specifying a guest physical address (GPA) of a memory buffer and a second parameter specifying a host virtual address (HVA) of the memory buffer. The memory buffer may be accessed by the hypervisor when executing the hypercall. In implementations, the processing logic may use the HVA to access the memory buffer after validating that the HVA is a correct address for the memory buffer, as described in more detail herein above.

At block 320, the processing logic may translate the GPA to a first host physical address (HPA). Similarly, at block 325, the processing logic may translate the HVA to a second HPA. In implementations, the processing logic may use a VM page table and a hypervisor page table that are maintained by the hypervisor, in order to perform the translation, as described in more detail herein.

At block 320, the processing logic may compare the first HPA and the second HPA to determine whether the two HPAs match. In implementations, the processing logic may determine that the HVA is a valid address for the memory buffer if the HPA corresponding to the GPA from the VM matches the HPA corresponding to the HVA from the VM. At block 340, when the processing device determines that the first HPA matches the second HPA, the processing device may determine that the HVA is a valid address for the memory buffer and may execute the hypercall, as described in more detail herein.

Figure 3B:
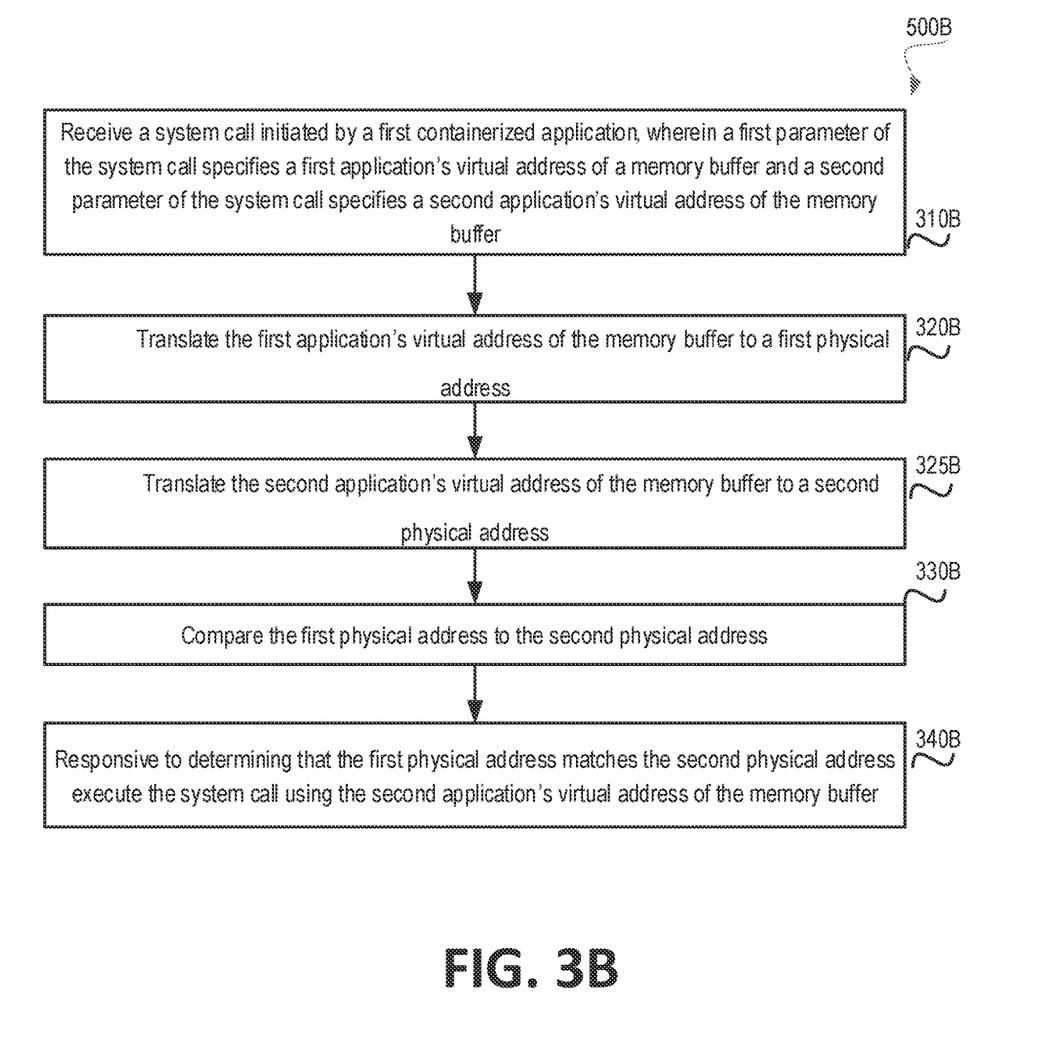
FIG. 3B is a flow diagram of an example method of memory efficient virtual address management for system calls, in accordance with one or more aspects of the present disclosure.

FIG. 3B is a flow diagram of an example method of memory efficient host virtual address management for system calls, in accordance with one or more aspects of the present disclosure. Method 300 may be performed by processing logic that includes hardware (e.g., circuitry, dedicated logic, programmable logic, microcode, etc.), software (e.g., instructions run on a processor to perform hardware simulation), or a combination thereof. Method 300B or each of its individual functions, routines, subroutines, or operations may be performed by one or more processors of a computer system (e.g., the computer system 100 of FIG. 1 or apparatus 200B of FIG. 2B) implementing the method. In an illustrative example, method 300B may be performed by a single processing thread. Alternatively, method 300B may be performed by two or more processing threads, each thread implementing one or more individual functions, routines, subroutines, or operations of the method. In an illustrative example, the processing threads implementing method 300B may be synchronized (e.g., using semaphores, critical sections, or other thread synchronization mechanisms). Alternatively, the processing threads implementing method 300B may be executed asynchronously with respect to each other. Therefore, while FIG. 3B and the associated description lists the operations of method 300B in certain order, various implementations of the method may perform at least some of the described operations in parallel or in arbitrary selected orders.

Method 300B may begin at block 310B. At block 310B, the processing logic may receive, by a supervisor managing a virtual machine (application), a system call initiated by the application. The system call may have at least two parameters; a first parameter specifying a GPA first application's virtual address of a memory buffer and a second parameter specifying a second application's (e.g., operating system's) virtual address of the memory buffer. The memory buffer may be accessed by the supervisor when executing the system call. In implementations, the processing logic may use the second application's virtual address to access the memory buffer after validating that the second application's virtual address is a correct address for the memory buffer, as described in more detail herein above.

At block 320B, the processing logic may translate the first application's virtual address to a physical address. Similarly, at block 325B, the processing logic may translate the second application's (e.g., operating system's) virtual address to a second physical address. In implementations, the processing logic may use an application page table and a supervisor page table that are maintained by the supervisor, in order to perform the translation, as described in more detail herein.

At block 320B, the processing logic may compare the first physical address and the second physical address to determine whether the two physical addresses match. In implementations, the processing logic may determine that the second application's (e.g., operating system's) virtual address is a valid address for the memory buffer if the physical address corresponding to the first application's virtual address from the first application matches the physical address corresponding to the second application's (e.g., operating system's) virtual address from the first application. At block 340B, when the processing device determines that the first physical address matches the second physical address, the processing device may determine that the second application's (e.g., operating system's) virtual address is a valid address for the memory buffer and may execute the system call, as described in more detail herein.

Figure 4:
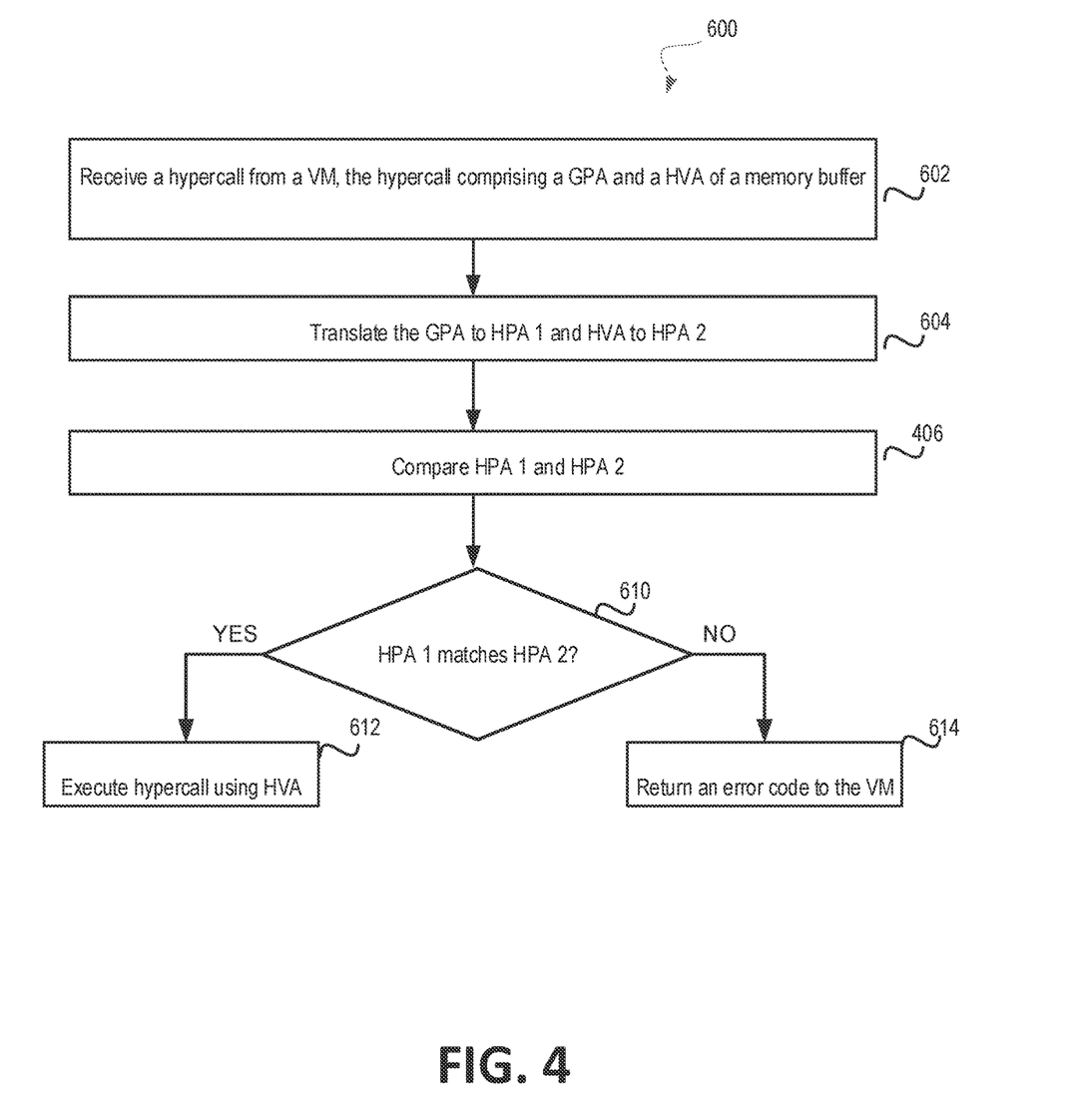
FIG. 4 is a flow diagram of another example method of memory efficient host virtual address management for hypercalls, in accordance with one or more aspects of the present disclosure.

FIG. 4 is a flow diagram of another example method of memory efficient host virtual address management for hypercalls, in accordance with one or more aspects of the present disclosure. Method 400 may be performed by processing logic that includes hardware (e.g., circuitry, dedicated logic, programmable logic, microcode, etc.), software (e.g., instructions run on a processor to perform hardware simulation), or a combination thereof. Method 400 or each of its individual functions, routines, subroutines, or operations may be performed by one or more processors of a computer system (e.g., the computer system 100 of FIG. 1 or apparatus 200 of FIG. 2) implementing the method. In an illustrative example, method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel or in arbitrary selected orders.

Method 400 may begin at block 402. At block 402, the processing logic may receive, by a hypervisor managing a virtual machine (VM), a hypercall comprising at least two parameters; a first parameter specifying a guest physical address (GPA) of a memory buffer and a second parameter specifying a host virtual address (HVA) of the memory buffer. The memory buffer may be accessed by the hypervisor when executing the hypercall, as described in more detail herein above.

At block 404, the processing logic may translate the GPA of the hypercall to a host physical address HPA 1 and may also translate the HVA of the hypercall to HPA 2. In implementations, the processing logic may use a VM page table and a hypervisor page table that are maintained by the hypervisor, in order to perform the translation, as described in more detail herein.

At block 406, the processing logic may compare HPA 1 and HPA 2 to determine whether the two HPAs match, which in turn may indicate that the HVA from the hypercall is a valid address for the memory. At block 410, the processing device may make a decision of whether HPA 1 matches HPA 2 based on the results of the comparison. For example, the processing logic may determine that HPA 1 matches HPA 2 is the HPAs are identical to one another. At block 412, the processing device determines that HPA 1 matches HPA 2. In this case, the processing device may execute the hypercall using the HVA, as described in more detail herein.

On the other hand, at block 414, when the processing device determines that HPA 1 does not match HPA 2. In this case, the processing device may return an error to the VM, indicating that the HVA, the GPA, or both addresses of the memory buffer are invalid, as explained in more details herein above.

Figure 4B:
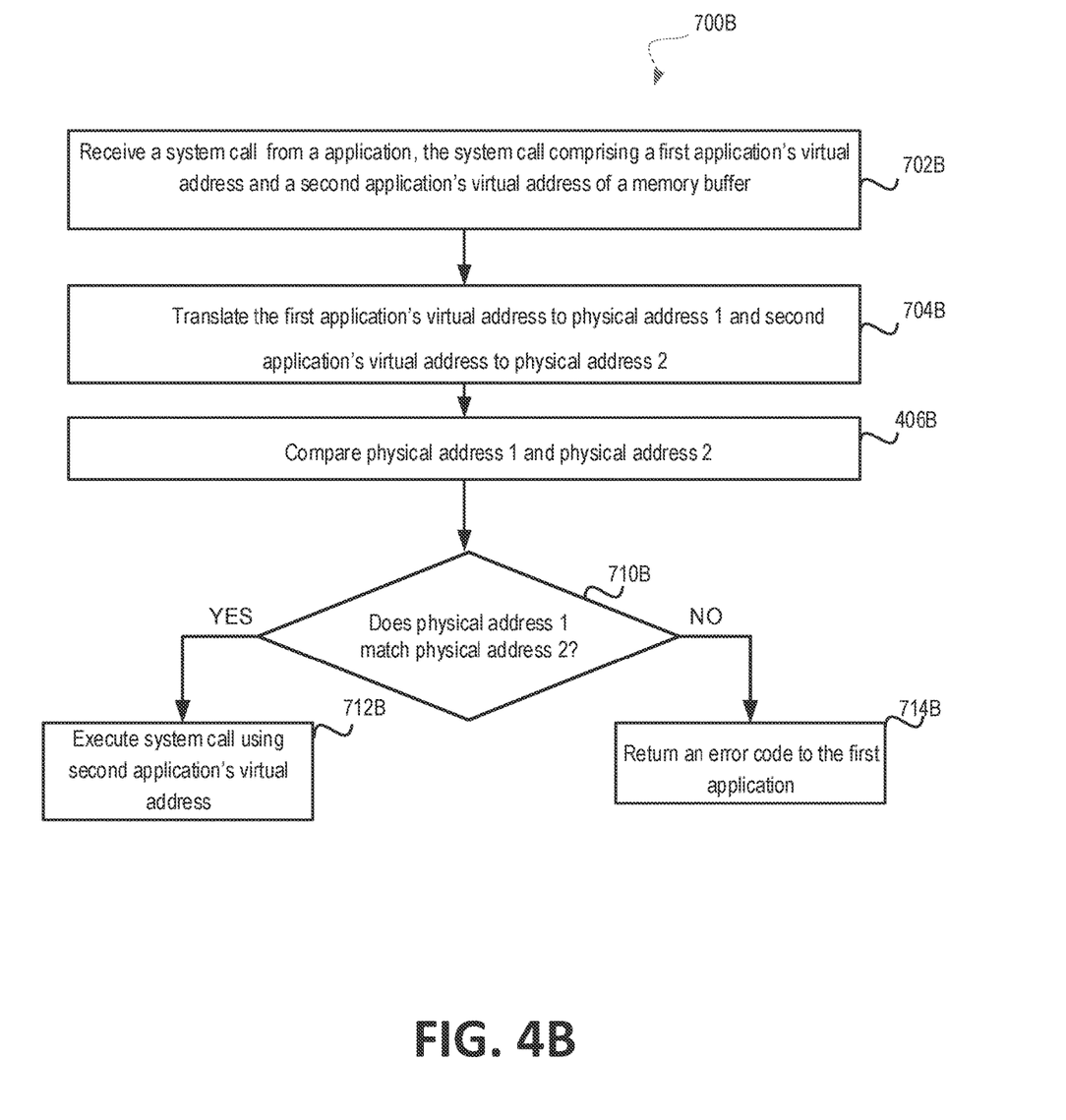
FIG. 4B is a flow diagram of another example method of memory efficient virtual address management for system calls, in accordance with one or more aspects of the present disclosure.

FIG. 4B is a flow diagram of another example method of memory efficient host virtual address management for system calls, in accordance with one or more aspects of the present disclosure. Method 400B may be performed by processing logic that includes hardware (e.g., circuitry, dedicated logic, programmable logic, microcode, etc.), software (e.g., instructions run on a processor to perform hardware simulation), or a combination thereof. Method 400B or each of its individual functions, routines, subroutines, or operations may be performed by one or more processors of a computer system (e.g., the computer system 100 of FIG. 1 or apparatus 200B of FIG. 2B) implementing the method. In an illustrative example, method 400B may be performed by a single processing thread. Alternatively, method 400B may be performed by two or more processing threads, each thread implementing one or more individual functions, routines, subroutines, or operations of the method. In an illustrative example, the processing threads implementing method 400B may be synchronized (e.g., using semaphores, critical sections, or other thread synchronization mechanisms). Alternatively, the processing threads implementing method 400B may be executed asynchronously with respect to each other. Therefore, while FIG. 4B and the associated description lists the operations of method 400B in certain order, various implementations of the method may perform at least some of the described operations in parallel or in arbitrary selected orders.

Method 400B may begin at block 402B. At block 402B, the processing logic may receive, by a supervisor managing a containerized application, a system call comprising at least two parameters: a first parameter specifying a first application's virtual address of a memory buffer and a second parameter specifying a second application's (e.g., operating system's) virtual address of the memory buffer. The memory buffer may be accessed by the supervisor when executing the system call, as described in more detail herein above.

At block 404, the processing logic may translate the first application's virtual address of the system call to a physical address 1 and may also translate the second application's (e.g., operating system's) virtual address of the system call to physical address 2. In some implementations, the processing logic may use an application page table and a supervisor page table that are maintained by the supervisor, in order to perform the translation, as described in more detail herein.

At block 406B, the processing logic may compare physical address 1 and physical address 2 to determine whether the two physical addresses match, which in turn may indicate that the second application's (e.g., operating system's) virtual address from the system call is a valid address for the memory buffer. At block 410B, the processing device may make a decision of whether physical address 1 matches physical address 2 based on the results of the comparison. For example, the processing logic may determine that physical address 1 matches physical address 2 if the physical addresses are identical to one another. At block 412B, the processing device determines that physical address 1 matches physical address 2. In this case, the processing device may execute the system call using the second application's (e.g., operating system's) virtual address, as described in more detail herein.

On the other hand, at block 414B, the processing device determines that physical address 1 does not match physical address 2. In this case, the processing device may return an error to the application, indicating that the second application's (e.g., operating system's) virtual address, the first application's virtual address, or both addresses of the memory buffer are invalid, as explained in more details herein above.

Figure 5:
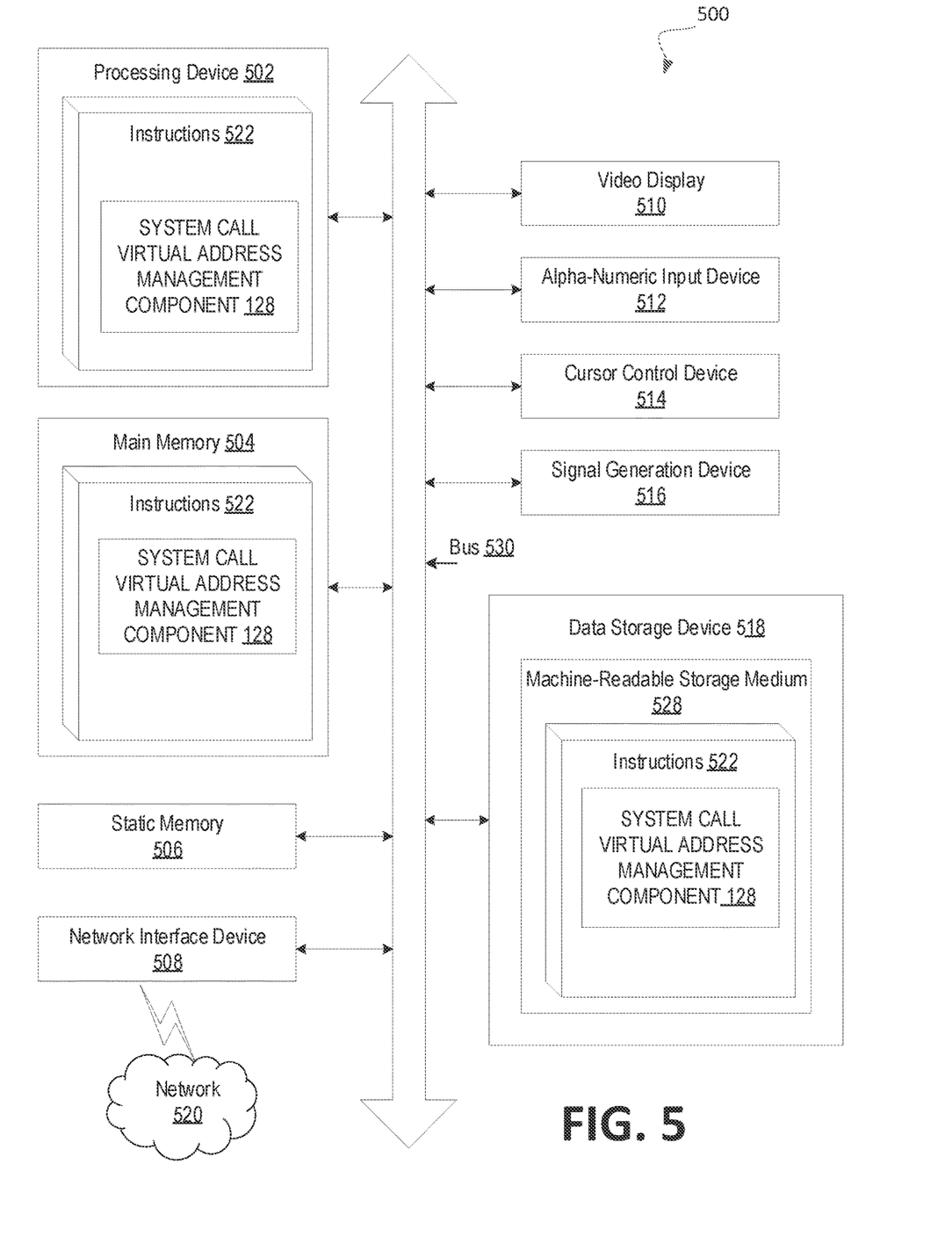
FIG. 5 depicts a block diagram of a computer system operating in accordance with one or more aspects of the disclosure.

FIG. 5 depicts a block diagram of a computer system operating in accordance with one or more aspects of the disclosure. In various illustrative examples, computer system 500 may correspond to a computing device 110 within system architecture 100 of FIG. 1. In one implementation, the computer system 500 may be the computer system 110 of FIG. 1. The computer system 500 may be included within a data center that supports virtualization. Virtualization within a data center results in a physical system being virtualized using VMs and/or containerized applications to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources. A containerized application may be a software-based emulation of operating system and application resources. For example, the containerized application may operate in a container that packages together all the code, its dependencies, operating system needed to run the application. Containers thereby utilize a form of OS virtualization that take advantage of the host operating system to isolate particular processes and control the processes' access to processing and memory resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 518, which may communicate with each other via a bus 530.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 508. Computer system 500 also may include a video display unit 510 (e.g., an LCD), an alphanumeric input device 512 (e.g., a keyboard), a cursor control device 514 (e.g., a mouse), and a signal generation device 516.

Data storage device 518 may include a non-transitory computer-readable storage medium 528 on which may store instructions 522 embodying any one or more of the methodologies or functions described herein (e.g., system call virtual address management component 128 of FIG. 1, and methods 300 and 400 of FIGS. 3 and 4, respectively). Instructions 522 may also reside, completely or partially, within volatile memory 504 and/or within processing device 502 during execution thereof by computer system 500, hence, volatile memory 504 and processing device 502 may also constitute machine-readable storage media.

While computer-readable storage medium 528 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, and 400, and/or each of their individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
receiving, by a supervisor managing a first application, a system call initiated by the first application, wherein a first parameter of the system call specifies a first memory buffer virtual address of the first application and a second parameter of the system call specifies a second memory buffer virtual address of a second application;
translating, by the supervisor, the first memory buffer virtual address of the first application to a first physical address;
translating, by the supervisor, the second memory buffer virtual address of the second application to a second physical address;
comparing, by the supervisor, the first physical address to the second physical address; and
responsive to determining that the first physical address matches the second physical address, executing, by the supervisor, the system call using the second memory buffer virtual address of the second application.

2. The method of claim 1 further comprising:
responsive to determining that the first physical address does not match the second physical address, returning an error code to the first application.

3. The method of claim 1 further comprising:
responsive to determining that the first physical address does not match the second physical address, notifying the first application of a different memory buffer virtual address of the second application corresponding to the first memory buffer virtual address of the first application.

4. The method of claim 1, wherein the second application is an operating system.

5. The method of claim 1, wherein translating the first memory buffer virtual address of the first application to the first physical address is performed using a shadow page table maintained by the supervisor.

6. The method of claim 1, wherein translating the second memory buffer virtual address of the second application to the second physical address is performed using a supervisor page table maintained by the supervisor.

7. The method of claim 1, wherein executing the system call further comprises accessing, by the supervisor, the memory buffer referenced by the second memory buffer virtual address of the second application.

8. A system comprising:
a memory;
a processing device operatively coupled to the memory, the processing device to:
receive a system call initiated by a first application, wherein a first parameter of the system call specifies a first memory buffer virtual address of the first application and a second parameter of the system call specifies a second memory buffer virtual address of a second application;
translate the memory buffer virtual address of the first application to a first physical address;
translate the memory buffer virtual address of the second application to a second physical address;
compare the first physical address to the second physical address; and
responsive to determining that the first physical address matches the second physical address, execute the system call using the second memory buffer virtual address of the second application.

9. The system of claim 8, wherein the processing device is further to:
responsive to determining that the first physical address does not match the second physical address, return an error code to the first application.

10. The system of claim 8, wherein the second application is an operating system.

11. The system of claim 8, wherein to translate the first memory buffer virtual address of the first application to the first physical address, the processing device is to use a shadow page table maintained by a supervisor managing the first application.

12. The system of claim 8, wherein to translate the second memory buffer virtual address of the second application to the second physical address, the processing device is to use a supervisor page table maintained by a supervisor managing the first application.

13. The system of claim 8, wherein the processing device is further to:
responsive to determining that the first physical address does not match the second physical address, notify the first application of a different memory buffer virtual address of the second application corresponding to the first memory buffer virtual address of the first application.

14. The system of claim 8, wherein to execute the system call, the processing device is further to access the memory buffer referenced by the second memory buffer virtual address of the second application.

15. A non-transitory computer-readable media storing instructions that, when executed, cause a processing device to:
receive a system call initiated by a first application, wherein a first parameter of the system call specifies a first memory buffer virtual address of the first application and a second parameter of the system call specifies a second memory buffer virtual address of a second application;
translate the memory buffer virtual address of the first application to a first physical address;
translate the memory buffer virtual address of the second application to a second physical address;
compare the first physical address to the second physical address; and
responsive to determining that the first physical address matches the second physical address, execute the system call using the second memory buffer virtual address of the second application.

16. The non-transitory computer-readable media of claim 15, wherein to translate the first memory buffer virtual address of the first application to the first physical address, the processing device is to use a shadow page table maintained by a supervisor managing the first application.

17. The non-transitory computer-readable media of claim 15, wherein to translate the second memory buffer virtual address of the second application to the second physical address, the processing device is to use a supervisor page table maintained by a supervisor managing the first application.

18. The non-transitory computer-readable media of claim 15, wherein the processing device is further to:
responsive to determining that the first physical address does not match the second physical address, return an error code to the first application.

19. The non-transitory computer-readable media of claim 15, wherein the second application is an operating system.

20. The non-transitory computer-readable media of claim 15, wherein to execute the system call, the processing device is further to access the memory buffer referenced by the second memory buffer virtual address of the second application.

* * * * *